Feb. 1, 1938. L. M. GOLDSMITH Re. 20,643

SAFETY DEVICE

Original Filed May 31, 1934

INVENTOR
Lester M. Goldsmith
BY
T. Wallace Quinn
his ATTORNEY

Reissued Feb. 1, 1938

Re. 20,643

UNITED STATES PATENT OFFICE 20,643

SAFETY DEVICE

Lester M. Goldsmith, Philadelphia, Pa.

Original No. 2,028,149, dated January 21, 1936, Serial No. 728,360, May 31, 1934. Application for reissue February 27, 1937, Serial No. 128,286

12 Claims. (Cl. 137—162)

This invention relates to safety devices. It is particularly adapted to be used in connection with valves of standard appearance. It provides for automatic operation in response to temperature increase above a predetermined value.

More particularly, this invention relates to valves which, under normal conditions, are manually operable, and which, under emergency conditions, are automatically and positively operable in response to changes in temperature. Specifically, the improved valve mechanism comprises a manually operable valve provided with means for automatic and positive operation, independently of manual control, under conditions of abnormal temperature.

For purposes of illustrating my invention, I show in the drawing and describe hereinafter a valve which has a valve head carried by a stem which is keyed to a rotatable operating shaft. The operating shaft is provided with a spring which exerts pressure on the stem to hold it in contact with a fusible plug also carried in or by the operating shaft. The spring is maintained under constant compression and is effective to actuate the stem in the event of fusing of the plug, and such actuation of the stem is effective to seat or unseat the valve head according to the use for which the valve is designed. The spring is so designed that it remains under compression even after it has actuated the valve stem, thus it continues to exert pressure on the valve stem tending to push the same outwardly even after the valve stem has reached its limit of outward movement.

Other objects, novel features and advantages of this invention will become apparent from the following specification and accompanying drawing, wherein.

Figure 1:
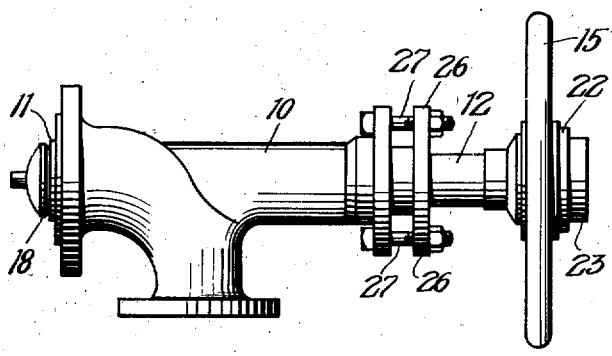
Fig. 1 is a side elevation of a valve embodying the invention.
Figure 2:
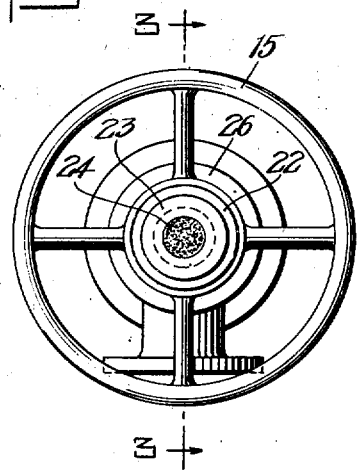
Fig. 2 is an end view thereof.
Figure 3:
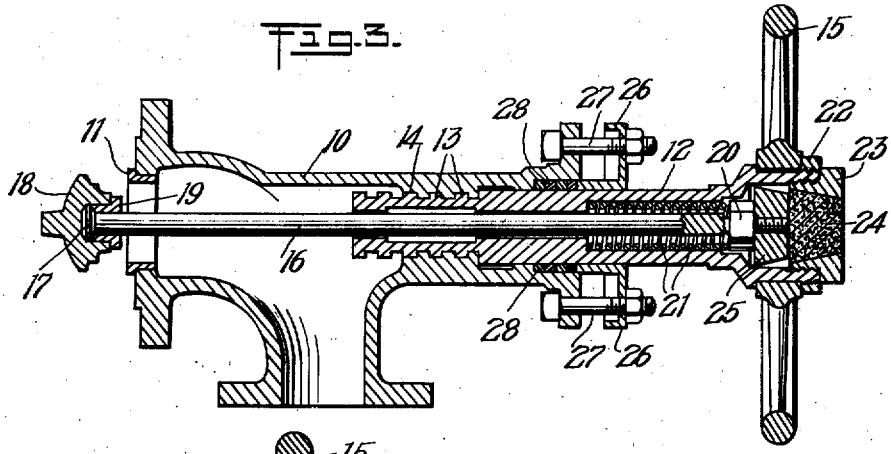
Fig. 3 is a section on the line 3—3 of Fig. 2 with the fusible plug in normal position.

The valve shown in the drawing is designed for normal manual operation and for automatic closing upon increase of temperature above a predetermined value. It is to be understood, however, that the invention is equally applicable to a valve designed for automatic opening upon temperature increase above a predetermined value and that the difference between the two types of valves involves merely reversal of the arrangement of valve head and seat.

A casing 10 is provided with an inlet aperture in which is arranged a valve seat 11. An operating shaft 12 is provided at its inner end with threads 13 which cooperate with threads 14 formed on the inner surface of the casing 10 to effect axial movement of the shaft upon rotation thereof. A hand wheel 15 is keyed to the shaft 12. The shaft 12 is tubular and a stem 16 is slidably mounted therein. The left end of the stem 16 is provided with an enlargement 17 which fits into a recess in the valve head 18 and a ring 19 fastened to the valve head 18 engages the enlargement 17 to hold the stem 16 and head 18 together. The valve head 18 is preferably thus mounted upon stem 16 so that it is free to rotate independently of the stem. The right end of the stem 16 is threaded and carries nut 20 against which bears one end of a helical spring 21 arranged around the stem in a recess provided for the purpose, the other end of the spring being in contact with the end wall of the recess.

The hand wheel 15 is secured to the shaft 12 by a lock nut 22. A plug 23 is threaded into said shaft. The plug 23 comprises a casing having a tapered aperture which is filled with fusible material 24. A tapered sleeve 25 surrounds the part of the stem extending beyond the nut 20 and engages both the nut 20 and the fusible material 24. The nut 20 normally seats in a recess of corresponding configuration and serves to key the stem 16 to the shaft 12 for unitary rotation.

A gland 26 surrounds the shaft 12 and is held to the casing 10 by bolts 27. Packings 28 are compressed by the gland and form a fluid-tight joint between the shaft and the casing.

Figure 4:
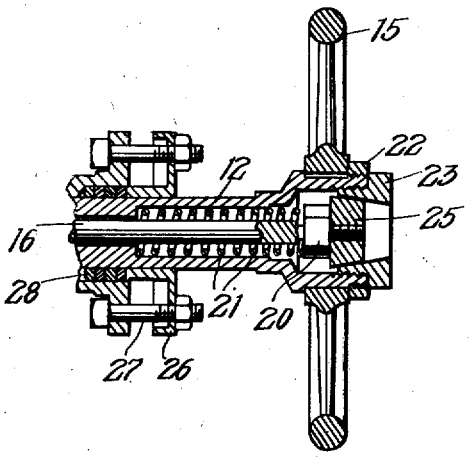
Fig. 4 is a similar fragmentary view with the valve stem actuated by the spring, the fusible plug having been melted.

In normal operation of the valve, the shaft 12 is rotated by manual operation of the hand wheel 15 to either seat the valve head 18 on the valve seat 11 or to unseat the same. If, while the valve is open, the temperature increases beyond a predetermined value, the fusible material 24 will soften, thereby releasing the stem 16 and permitting the spring 21 to move the stem 16 to the right as shown in Fig. 4, thereby bringing the valve head 18 on to the valve seat 11, and the tapered sleeve 25 into engagement with the wall of the tapered aperture in plug 23, thus sealing off the valve stem assembly and preventing escape of fluid therethrough. The spring 21 is of such length and of such design that it remains under compression after the head 18 has engaged the seat 11, thus insuring definite and positive closing of the valve.

After automatic operation of the valve, the plug 23 is removed and refilled with fusible material and then reinserted into the end of the shaft 12. Preferably, before the plug is reinserted, the hand wheel 15 is rotated to bring the shaft into normal valve closing position, thus bringing the nut 20 into its recess and moving the end of the stem 16 into such position that it does not interfere with the insertion of the plug 23.

It is to be noted that in a valve as illustrated in the drawing, when the valve has been fully opened manually, the spring 21 associated with the shaft 12 is under such compression that if or when the fusible material 24 softens and permits the valve stem 16 to move to the right, the spring is capable of exerting sufficient force for a sufficient distance to move the stem 16 until the valve head 18 is tightly held against the valve seat 11.

Furthermore, in accordance with the preferred illustrative embodiment of my invention shown in the drawing and described herein in detail, it is to be particularly noted that during any manual operation, the spring which actuates same in an emergency, is always under constant compression, thus preserving the life of the spring during such manual operation. Thus, in such preferred embodiment, there is provided a positive means for actuating the valve in an emergency, which means remains undisturbed during the ordinary usage of the valve.

The relationship between the conical walls of the sleeve and the tapered aperture in the plug 23 prevents any possibility of the spring forcing the stem out through the aperture and, in a valve having the valve head 11 reversely disposed, for automatic opening of the valve, the relationship above described limits the movement of the stem.

A feature of my invention that is of substantial importance, particularly when the valve is being employed in connection with inflammable fluids, is the prevention of leakage about or around the valve stem when an emergency actuation occurs. Thus, in the valve illustrated in the drawing, the tapered sleeve 25 seats against the conical inner walls of the plug 23, the fusible material 24 having become molten and forced outwardly, such seating forming a fluid-tight seal so that passage of fluid between the stem 16 and shaft 12 is prevented.

It is of course apparent that various changes may be made in the embodiment of my invention above described. The scope of my invention is defined in the appended claims.

The valve proper as described herein and shown in the drawing, that is, the arrangement of parts 18, 11, and 10, disclosed in the drawing and hereinabove referred to, are employed by me for purposes of illustration and without intending that such parts, or association of parts, per se, are to be considered as my invention.

What I claim is:

1. A valve operating mechanism comprising a handle for manually operating a valve stem, and means interposed between said handle and said valve stem for automatically actuating said valve stem, said means comprising a spring under compression for actuating said valve stem, said spring being substantially out of contact with fluid passing about said valve stem and a fusible member, which upon fusion, permits automatic actuation of said stem independently of said handle.

2. In combination, a valve stem, a valve operating handle cooperating with said stem to effect manual operation of the stem, and means associated with said stem and handle to cause automatic actuation of said stem, independently of said handle, at a predetermined temperature, said means comprising a spring for actuating said stem, said spring being substantially out of contact with fluid passing about said stem, and a member fusible at said predetermined temperature to permit spring actuation of said stem.

3. In combination, a valve casing having a valve seat, a valve head movable into and out of engagement with said seat, a valve stem connected to said valve head, a tubular operating shaft cooperating with and manually movable with respect to said casing, said stem extending into said shaft, a spring under compression interposed between said operating shaft and a portion of the stem contained within said shaft, an abutment upon the stem, a fusible member arranged adjacent the end of the shaft opposite that into which said stem extends, said spring pressing against said abutment, thereby to urge said stem toward said fusible member.

4. In combination, a valve casing having a valve seat, a valve head assembly normally adapted for movement as a unit with respect to said casing, which comprises a valve head cooperating with said valve seat, a tubular member cooperating with said casing and manually movable with respect thereto, a valve stem extending from said valve head into one end of said tubular member, a spring normally under substantially its maximum compression, interposed between the tubular member and a portion of the stem contained therewithin, an abutment on said stem against which said spring presses, a fusible member arranged adjacent the other end of the tubular member, said spring urging said stem in the direction of said fusible member, whereby upon fusion of said fusible member said spring functions to move said valve head and stem independently of said tubular member.

5. In a valve, a casing having a valve seat, a valve head movable into and out of engagement with said seat, an operating shaft having threaded connection with said casing, said operating shaft being tubular and having a threaded part adjacent its outer end, a plug having a threaded portion of non-fusible material adapted for threaded engagement with said threaded part of said shaft and having a fusible portion, a stem extending from said valve head into said operating shaft and being slidable therein, a spring forcing said stem into engagement with said fusible portion, and means carried by said stem adapted to coact with said non-fusible portion of said plug to limit the movement of said stem in response to actuation by said spring upon fusion of said fusible portion.

6. In a valve, a casing having a valve seat, a valve head movable into and out of engagement with said seat, an operating shaft having threaded connection with said casing, said operating shaft being tubular and having an axial recess at one end, a plug closing said recess and having a fusible portion, a stem extending from said valve head into said operating shaft into contact with said fusible portion, a spring in said recess, and a nut on said stem engaged by said spring whereby the end of the stem is held in contact with said fusible portion, said recess having a portion shaped to receive said nut and to hold the same against rotation.

7. In a valve, a casing having a valve seat, a valve head movable into and out of engagement with said seat, an operating shaft having threaded connection with said casing, said operating shaft being tubular and having an axial recess at one end, a plug closing said recess, said plug having an internal tapering bore and fusible material disposed therein, a stem extending from said valve head into said operating shaft and provided with a sleeve having a taper corresponding to the internal bore of the aforesaid plug, a spring in said axial recess, and a nut on said stem engaged by said spring, whereby the end of the stem provided with the tapered sleeve is held in contact with said fusible material, said axial recess having a portion shaped to receive said nut and to hold the same against rotation.

8. In a valve, a casing having a valve seat, a valve head movable into and out of engagement with said seat, an operating shaft having threaded connection with said casing, said operating shaft being tubular and closed at its outer end with a fusible plug, a stem extending from said valve head into said operating shaft to engage said plug, and a spring holding said stem in engagement with said plug, said spring being effective to move the valve stem upon fusing of said plug and cooperating sealing parts carried by said stem and shaft which are adapted to be brought into sealing relationship as a result of movement of said stem upon fusion of said plug.

9. In combination, a valve casing, a valve movable to control flow through said casing, operating means for said valve comprising a manually rotatable reciprocating member, a stem connecting said valve and said member, a fusible plug in said member engaging the end of said stem and a spring interposed between said member and said stem for moving said stem to locate the valve in predetermined position upon fusing of the plug and cooperating sealing parts carried by said stem and said member adapted to limit movement of said stem in response to said spring and to be brought into sealing relationship as a result of such movement.

10. In combination, a valve casing, a valve member movable to control flow through said casing, means associated with said valve member for manually operating same and comprising a valve stem and a fusible member associated with said stem, means for positively actuating said valve stem upon fusion of said fusible member, said valve operating member also comprising means which permits limited free movement of the valve stem and which effects a seal against fluid leakage along said valve stem, said means adapted to effect said seal only upon positive emergency actuation of said valve member.

11. In combination, a valve casing, a valve member, means for manually operating said valve member to control flow through said casing comprising a valve stem, means for automatically actuating said valve stem in an emergency, the means last mentioned comprising an element which during the manual operation of the valve remains substantially undisturbed, said operating means comprising means which permits limited free movement of the valve stem and which effects a seal along the valve stem upon completion of the movement of said stem when same has been automatically actuated.

12. In combination, means for controlling fluid flow through a valve casing provided with an inlet port and an outlet port, comprising a valve head attached to a valve stem, a valve operating handle cooperating with said stem to effect manual operation of the stem, and means associated with said stem and handle to cause automatic actuation of said stem, independently of said handle, at a predetermined temperature, said last mentioned means comprising a spring for actuating said stem, said spring being out of the path of fluid flow through said valve casing, and a member fusible at said predetermined temperature to permit spring actuation of said valve stem.

LESTER M. GOLDSMITH.